(12) United States Patent
Shen et al.

(10) Patent No.: US 7,430,323 B2
(45) Date of Patent: Sep. 30, 2008

(54) METHOD AND APPARATUS FOR 4-DIMENSIONAL IMAGE WARPING

(75) Inventors: Dinggang Shen, Cherry Hill, NJ (US); Christos Davatzikos, Philadelphia, PA (US)

(73) Assignee: Trustees of the University of Pennsylvania, Philadelphia, PA (US)

(*) Notice: Subject to any disclaimer, the term of this patent is extended or adjusted under 35 U.S.C. 154(b) by 778 days.

(21) Appl. No.: 10/912,965

(22) Filed: Aug. 5, 2004

(65) Prior Publication Data

US 2005/0031210 A1 Feb. 10, 2005

Related U.S. Application Data

(60) Provisional application No. 60/494,028, filed on Aug. 8, 2003.

(51) Int. Cl.
*G06K 9/62* (2006.01)
*G06T 17/00* (2006.01)

(52) U.S. Cl. .................. 382/215; 382/154; 345/424

(58) Field of Classification Search .......... 382/103, 382/131, 151, 154, 209, 215, 217, 294; 345/419, 345/424; 378/20
See application file for complete search history.

(56) References Cited

U.S. PATENT DOCUMENTS 6,633,686 B1 * 10/2003 Bakircioglu et al. ........ 382/294

OTHER PUBLICATIONS

Thompson, et al. "A framework for computational anatomy", pp. 13-34, Computing and Visualization in Science, Springer-Verlag 2002.*

Thompson, et al. "A surface based technique for warping three-dimensional images of the brain", pp. 402-417, IEEE 1996.*

Guest, et al "Robust point correspondence applied to two- and three-dimensional image registration", pp. 165-179, IEEE 2001.*

Zhiqiang Lao et al., Morphological classification of brains via high-deminsional shape transformations and machne learning methods; NeuroImage; 2004; pp. 46-57; vol. 21.

Calvin R. Maurer, Jr., MS, et al., A Review of Medical Image Registration; Interactive Image-Guided Neurosurgery; 1993; pp. 17-44; American Association of Neurological Surgeons; Park Ridge, IL.

Dinggang Shen and Christos Davatzikos, Hammer: Hierarchical Attribute Matching Mechanism for Elastic Registration; IEEE Trans Med Imaging; Nov. 2002; pp. 1421-1439, vol. 21, Issue 11.

* cited by examiner

*Primary Examiner*—Daniel G Mariam
(74) *Attorney, Agent, or Firm*—RatnerPrestia

(57) ABSTRACT

A method of atlas mapping and an apparatus for image mapping are provided. The method includes generating a four dimensional template, linearly transforming the four dimensional representation of a subject to the four dimensional template, generating attribute vectors for a plurality of points of the linearly transformed four dimensional representation of the subject and of the four dimensional template, the plurality of points consisting of a plurality of temporally successive voxels of the four dimensional representation of the subject and of the four dimensional template, evaluating the generated attribute vectors to identify points in the four dimensional template that correspond to the four dimensional representation of the subject, and deforming the four dimensional template to the four dimensional representation of the subject according to relative positions of the corresponding points of the linearly transformed four dimensional representation of the subject and of the four dimensional template.

23 Claims, 4 Drawing Sheets

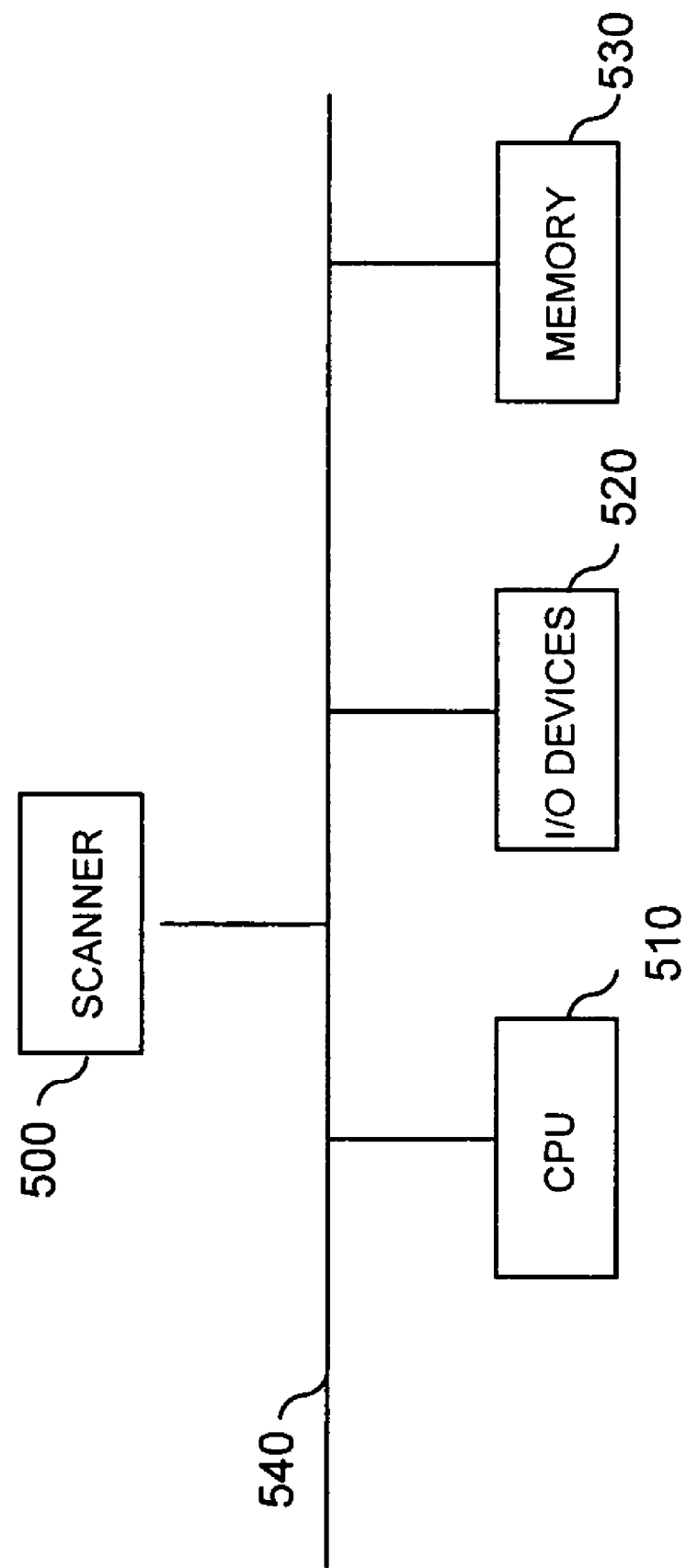

METHOD AND APPARATUS FOR 4-DIMENSIONAL IMAGE WARPING

CROSS-REFERENCE TO RELATED APPLICATION

This application claims the benefit of priority from U.S. Provisional Application No. 60/494,028, filed Aug. 8, 2003 the contents of which are incorporated herein by reference.

FIELD OF THE INVENTION

The invention relates to image warping and, more particularly, to a 4-dimensional image warping method and apparatus to warp a 4-dimensional anatomical template to a 4-dimensional image-based representation of a subject.

BACKGROUND OF THE INVENTION

Changes to a subject which occur over an extended period of time (i.e., also referred to as longitudinal changes) can be measured using highly accurate segmentation and volumetric measurements of structures of the subject. For example, when measuring longitudinal changes in brain structure, segmentation and volumetric measurements of the brain structure may be completed, either manually or by labeled atlas warping, from images acquired at different time-points. Segmentation methods typically fall into two categories, manual segmentation methods and automatic/semi-automatic segmentation methods. Manual segmentation may include extensive human interaction and considerable training of an individual (rater) providing the manual segmentation. Intra-rater reproducibility and inter-rater agreement are difficult to achieve in a longitudinal study in which manual segmentation is used, particularly when small longitudinal changes are to be measured. This has led to the development of automatic/semi-automatic image segmentation and parcelation methods, often based on atlas matching and registration. Furthermore, there are two categories of automatic registration methods. The first category includes methods based on feature matching, in which spatial transformations are calculated from a number of distinct features, for example, anatomical features, and correspondences are established either manually, semi-automatically, or fully automatically for these distinct anatomical features. The distinct anatomical features are distinct landmark points or a combination of curves and surfaces, for example, in a morphological brain these distinct anatomical features may be, for example, sulci or gyri. The second category includes methods based on volumetric transformations to maximize a similarity between a subject and a template, and generally assume that the subject and the template are acquired by a common imaging protocol.

All of the above-mentioned warping methods are mainly designed for three dimensional (hereafter sometimes referred to as 3D) images. Consequently, applying these warping methods independently for each time-point in a longitudinal study of a plurality of 3D images typically leads to noisy longitudinal measurements, particularly, for small structures such as the hippocampus, due to inconsistencies in atlas matching among different time-points. Smoothness in the longitudinal measurements (i.e., measurement taken over an extended time period) may be generally assumed, as long as longitudinal images of the subject are collected with adequate temporal resolution. Although a smooth estimation of the longitudinal changes may be obtained by smoothing the measurements along the temporal dimension, the smoothed measurements, in general, can significantly deviate from actual image data, unless the smoothing is performed concurrently with the warping and, thus, takes into consideration the image features.

What is needed is a method and apparatus which overcomes the above-mentioned problems.

SUMMARY OF THE INVENTION

The present invention is embodied in a 4D template (sometimes referred to as a 4D atlas) matching method which simultaneously establishes longitudinal correspondences in a 4D representation of a subject and inter-subject correspondences between the 4D template and the 4D representation of the subject. The method may be fully automatic and may constrain smoothness in both spatial and temporal domains during a template matching operation to produce smooth and accurate estimations of longitudinal changes in the 4D representation of the subject. Features and matches guiding deformation of the 4D template are determined via a 4D image analysis, which significantly reduce noise and improve robustness in detecting the anatomical correspondence.

The present invention may include other embodiments of the method in which image features and matches that are recognized in substantially all time-points may guide the deformation of the 4D template and spurious features and matches that are recognized inconsistently recognized at different time-points may be eliminated.

The present invention may include further embodiments of the method in which points of the 4D template are hierarchically selected according to their measure of distinctiveness in an iterative process to substantially ensure that warping of the 4D template to the 4D representation of the subject avoids local minima.

To achieve the above and/or other aspects of the present invention, a method of atlas mapping is provided that uses rigidly aligned temporally successive three dimensional images of a subject to form a four dimensional representation of the subject, and includes generating a four dimensional template, linearly transforming the four dimensional representation of the subject to the four dimensional template, generating attribute vectors for a plurality of points of the linearly transformed four dimensional representation of the subject and of the four dimensional template, the plurality of points consisting of a plurality of temporally successive voxels of the four dimensional representation of the subject and of the four dimensional template, evaluating the generated attribute vectors to identify points in the four dimensional template that correspond to the four dimensional representation of the subject, and deforming the four dimensional template to the four dimensional representation of the subject according to relative positions of the corresponding points of the linearly transformed four dimensional representation of the subject and of the four dimensional template.

The method of atlas mapping may further include selecting points in the four dimensional template according to measures of distinctiveness between the evaluated attribute vectors of the four dimensional template such that the deforming of the four dimensional template is based on the selected points.

To achieve the above and/or other aspects of the present invention, a method of atlas mapping is provided that uses rigidly aligned temporally successive three dimensional images of a subject to form a four dimensional representation of the subject, and includes generating a four dimensional template, linearly transforming the four dimensional representation of the subject to the four dimensional template, determining attribute vectors for a plurality of points of the linearly transformed four dimensional representation of the subject and of the four dimensional template, the plurality of points consisting of a plurality of temporally successive voxels of the four dimensional representation of the subject and of the four dimensional template, establishing correspondences between the four dimensional representation of the subject and the four dimensional template according to similarities of the determined attribute vectors for the plurality of points of the linearly transformed four dimensional representation of the subject and of the four dimensional template, deforming a plurality of four dimensional subvolumes located around respective points of the four dimensional template according to relative positions of the corresponding points of the linearly transformed four dimensional representation of the subject and of the four dimensional template to provide a deformed four dimensional template, and smoothing the deformed four dimensional template.

The determining of the attribute vectors may include determining edge types, image intensities, wavelet coefficients and geometric moment invariants of the plurality of points of the linearly transformed four dimensional representation of the subject and of the four dimensional template The determining of the geometric moment invariants and/or wavelet coefficients for the plurality of points may include determining a plurality of four dimensional subvolumes located around respective ones of the plurality of points of the linearly transformed four dimensional representation of the subject and of the four dimensional template, calculating predetermined parameters that are invariant to rotation for the respective ones of the plurality of points of the linearly transformed four dimensional representation of the subject and of the four dimensional template according to the determined four dimensional subvolumes, and repeating the determining of the plurality of four dimensional subvolumes and the calculating of the predetermined parameters operations while adjusting the four dimensional subvolumes in size.

The determining of the attribute vectors for the plurality of points of the linearly transformed four dimensional representation of the subject and of the four dimensional template may include selecting the plurality of points according to either user input of measures of dissimilarity between respective points or neighboring points located around the respective points or of boundary types of the respective points; determining a four dimensional subvolume located around each selected point; calculating for each selected point, predetermined parameters corresponding to the selected point that are invariant to spatial rotation of the selected point according to the determined four dimensional subvolume; and repeating the determining of the four dimensional subvolume and the calculating of the predetermined parameters operations while adjusting the four dimensional subvolume in size.

The establishing of the correspondences between the linearly transformed four dimensional representation of the subject and the four dimensional template may include evaluating one or more measures of similarity of attribute vectors for each selected point of the four dimensional template to attribute vectors of selected points of the linearly transformed four dimensional representation of the subject, and matching each respective, selected point of the four dimensional template to a respective, selected points of the linearly transformed four dimensional representation of the subject, when the respective one or more measures of similarity of the respective, selected point of the four dimensional template to the respective, selected points of the linearly transformed four dimensional representation of the subject are largest among the evaluated one or more measures of similarity, and each of the one or more measures of similarity, respectively, is larger than one or more predetermined values.

According to other aspects of the present invention, a method of atlas mapping is provided that uses temporally successive three dimensional images of a subject to form a four dimensional representation of the subject, and includes generating a four dimensional template, establishing correspondences between neighboring three dimensional images of the subject according to determined spatial attribute vectors for the plurality of voxels of plural temporally successive three dimensional images of the subject, rigidly aligning the plural temporally successive three dimensional images of the subject according to the established correspondences between the neighboring three dimensional images of the subject, the rigidly aligned plural temporally successive three dimensional images being the four dimensional representation of the subject, linearly transforming the four dimensional representation of the subject to the four dimensional template, establishing correspondences between the four dimensional representation of the subject and the four dimensional template according to determined spatiotemporal attribute vectors for a plurality of points of the linearly transformed four dimensional representation of the subject and of the four dimensional template, the plurality of points consisting of a plurality of temporally successive voxels of the four dimensional representation of the subject and of the four dimensional template, deforming four dimensional subvolumes located around respective points of the four dimensional template according to relative positions of respective points of the four dimensional representation of the subject and of the four dimensional template to provide a deformed four dimensional template, when respective correspondences are established between the respective points of the linearly transformed four dimensional representation of the subject and the four dimensional template, and smoothing the deformed four dimensional template.

According to another aspect of the invention, the method of atlas mapping may further include selecting the four dimensional subvolumes located around the respective points of the four dimensional template according to measures of distinctiveness between the evaluated attribute vectors of the four dimensional template, wherein the deforming of the four dimensional template is based on the selected four dimensional subvolumes.

According to yet another aspect of the invention, the linear transforming of the four dimensional representation of the subject to the four dimensional template may be according to an affine transformation;

According to yet another aspect of the invention, the generation of the four dimensional template, the establishment of correspondences between the neighboring three dimensional images of the subject, the rigid alignment of the plural temporally successive three dimensional images of the subject, the linear transformation of the four dimensional representation of the subject, the establishment of the correspondences between the four dimensional representation of the subject and the four dimensional template, the deformation of the four dimensional subvolumes and the smoothing of the deformed four dimensional template operations may occur automatically without human intervention.

Additional aspects and/or advantages of the present invention will be set forth in part in the description which follows and, in part, will be obvious from the description, or may be learned by practice of the invention.

BRIEF DESCRIPTION OF THE DRAWINGS

The invention is best understood from the following detailed description when read in connection with the accompanying drawings. Included in the drawings are the following figures:

FIG. 5 is a block diagram of an atlas mapping system for providing an atlas map using either one of the methods illustrated in FIG. 1 or 4.

DETAILED DESCRIPTION OF THE INVENTION

Definition of Terms

Figure 1:
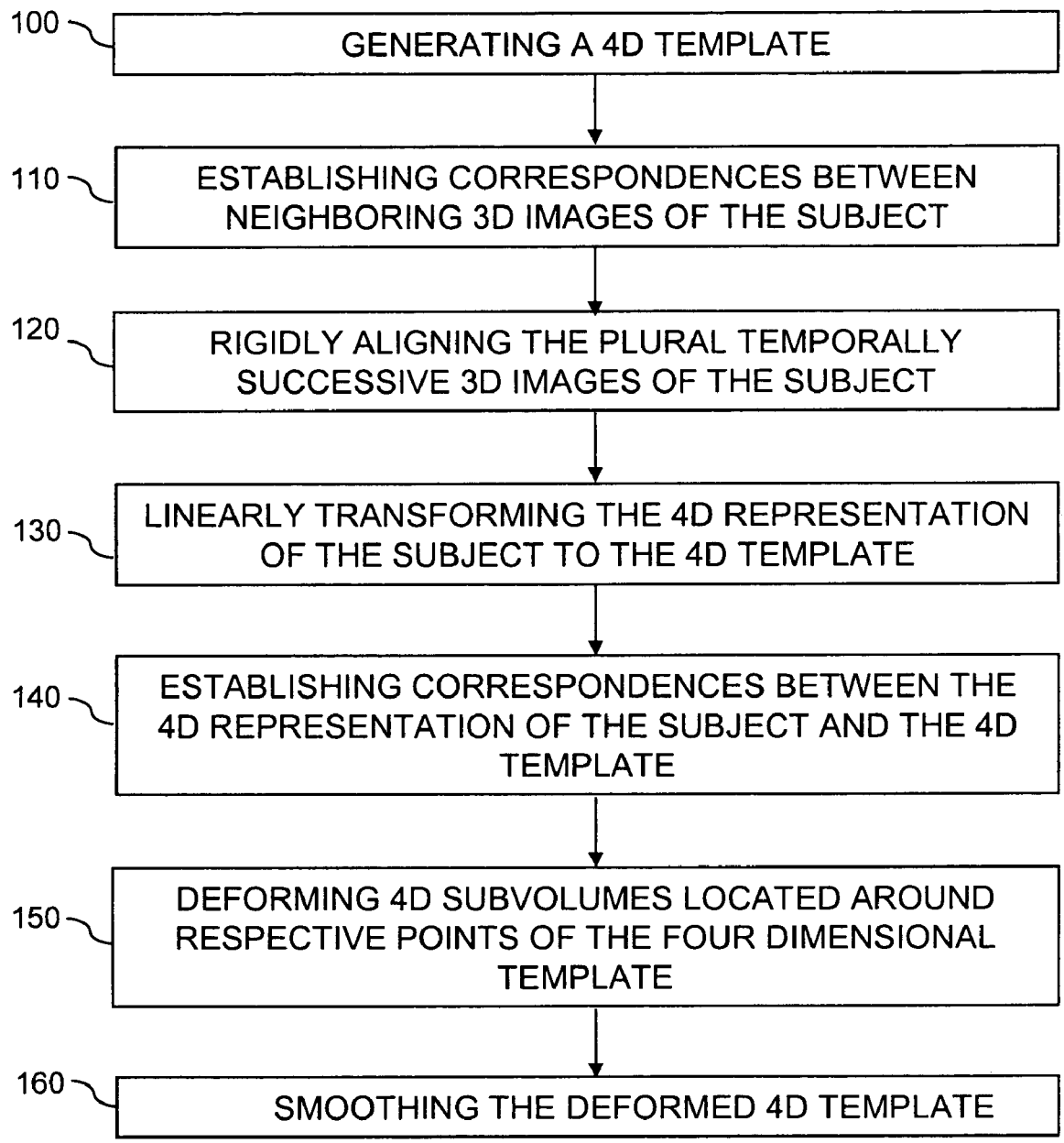
FIG. 1 is a flow chart of a method of atlas mapping in accordance with a first embodiment of the present invention.

"Voxel" refers to a 3D (i.e., volume) pixel of a 3D image.

"Four dimensions" refers to three spatial dimensions and one temporal dimension.

"Point" refers to a plurality of temporally successive voxels. Thus, a point spans four dimensions.

"Subvolume" refers to a volume located around a respective voxel.

"Four dimensional subvolume" refers to a spatiotemporal (i.e., 4D) volume located around a respective point. More particularly, the four dimensional subvolume is formed from a plurality of temporally successive 3D subvolumes.

"Spatial attribute vector" refers to an attribute vector corresponding to a respective voxel, which reflects an underlying structure of the respective voxel at different scales and, for example, may include morphological characteristics such as edge types, image intensity, and geometric moment invariants (GMIs). If the spatial attribute vector is rich enough, it may distinguish among different parts of a 3D image of a subject or a 3D template.

"Spatiotemporal attribute vector" refers to an attribute vector corresponding to temporally successive voxels. The spatiotemporal attribute vector reflects an underlying structure of the temporally successive voxels at different scales and may include morphological characteristics such as edge types, image intensity, wavelet coefficients, and GMIs. If the spatiotemporal attribute vector is rich enough, it may distinguish among different parts of a 4D representation of the subject or a 4D template.

The atlas mapping is based on warping a four dimensional 4D template to a 4D representation of a subject. For expediency, an example of atlas mapping of brain images is described. It is contemplated that the atlas mapping may be of any set of temporally successive images of a subject. That is, the temporally successive images of the subject may be temporally successive two dimensional or three dimensional (3D) images and can be produced from images such as magnetic resonance images (MRI), computed axial tomography (CAT) scans, positron emissions tomography (PET) scans, and digital photographic images, among others.

Mathematical Notations

The 4D representation of the subject and the 4D template include three spatial dimensions, i.e., represented by (x), and one temporal dimension, i.e., represented by (t), where x and t are spatial and temporal coordinates, respectively. Let T(x,t) denote an intensity of the 4D template at a point (x,t) and, therefore, $T_t(x)$ is a 3D template at time-point t. Similarly, S(x,t) denotes an intensity of the 4D representation of the subject, and $S_t(x)$ is a 3D image of the subject at time-point t. Spatial domains for the 4D template and the 4D representation of the subject may not be the same. Accordingly, $V_T$ is used for the spatial domain of the 4D template and $V_S$ for the spatial domain of the 4D representation of the subject. Moreover, the temporal domains of the 4D template and the 4D representation of the subject are assumed to be same. That is, N number of 3D images constitute the 4D template and the 4D representation of the subject, where $t \in [1,N]$. Because the 3D images of the subject are acquired at known time-points and temporal correspondence is thus known, there is no displacement along a temporal dimension during deformable registration operations. That is, the 3D template $T_t(x)$ is only permitted to warp towards the image of the subject $S_t(x)$ at the same time-point t. Accordingly, a displacement field u(x,t) defines a relative spatial deformation of the 3D template T(x,t) to the 3D image of the subject S(x+u(x,t),t). Let h(x,t) be a transformation corresponding to the displacement field u(x,t) such that h(x,t)=(x+u(x,t),t). The inverse transformation is $h^{-1}(x,t)$, which is hereafter sometimes referred to as a backward transformation.

FIG. 1 is a flow chart of a method of atlas mapping in accordance with a first embodiment of the present invention.

Referring to FIG. 1, a 4D template is generated at operation 100. The 4D template may preferably represent a 4D set of reference images. For example, to study longitudinal morphological changes of a brain of the subject, the 4D set of reference images may be a brain of a normal individual, a brain of the subject which is determined to have a normal structure (i.e., images taken prior to the brain of the subject, for example, being diseased) or a composite of brains of multiple individuals.

To generate the 4D template, a 3D reference image of one time-point may be repeated to construct the 4D template. Thus, the 4D template may desirable be used as a measurement unit, relative to which longitudinal changes of a 4D representation of the subject can be measured.

Although the exemplary 4D template is described as a repeated 3D image, it is contemplated that the 4D template may be generated with predetermined longitudinal changes, which take into account significant longitudinal changes of, for example, the brain of the subject at a particular time-point, if accurate registration of the brain of the subject may otherwise be difficult or impossible without the predetermined longitudinal changes being present in the 4D template.

After generating the 4D template at operation 100, correspondences may be established between neighboring 3D images of the subject according to similarities of determined spatial attribute vectors for the plurality of voxels of plural temporally successive 3D images of the subject at operation 110. A method for establishing such a correspondence is set forth in a publication (hereafter referred to as the Hammer publication) by the inventors entitled "HAMMER: hierarchical attribute matching mechanism for elastic registration", *IEEE Trans. Med. Imag.*, Volume: 21, Issue: 11 (2002), pp. 1421-1439 (November), the contents of which are incorporated herein by reference.

To establish the correspondence between neighboring 3D images of the subject, spatial attribute vectors (i.e., attribute vectors corresponding to voxels) may be determined for a plurality of voxels for plural temporally successive 3D images of the subject, and correspondences between neighboring 3D images of the subject may be established according to the similarities of the determined spatial attribute vectors for the plural temporally successive 3D images of the subject.

After establishing the correspondence between neighboring 3D images of the subject at operation 110, the plural temporally successive 3D images of the subject may be rigidly aligned according to the established correspondences at operation 120, the rigidly aligned plural temporally successive 3D images being the 4D representation of the subject.

To rigidly align the plural temporally successive 3D images of the subject, it is desirable to reconstruct the temporally successive 3D images of the subject from respective 3D images of the subject of different time-points. Because positions and orientations of the 3D images of the subject from different time-points are not the same, a rigid transformation may be estimated to align the temporally successive 3D images of the subject to produce the 4D representation of the subject. If $\{I_t(x), t \in [1,N]\}$ is the temporally successive 3D images of the subject before a rigid alignment and $I'_t(x)$ is the temporally successive 3D images of the subject after alignment then a time-point t image $I_t(x)$ of the subject prior to rigid alignment may be rigidly aligned with a previous time-point t−1 image $I'_{t-1}(x)$ of the subject, which is already aligned, where $2 \leq t \leq N$. That is, a first time-point image $I_1(x)$ of the subject is a standard image, i.e., $I'_1(x)=I_1(x)$ and a second time-point images of the subject may be aligned to the standard image. Moreover, subsequent time-point images of the subject may be aligned to immediately previous time-point images which have previously been aligned.

Correspondences between the two neighboring images $I_t(x)$ and $I'_{t-1}(x)$ of the subject is established and rigid transformation parameters are calculated from the established correspondences by a least-square estimation method. If a rigid transformation is assumed from $I_t(x)$ to $I'_{t-1}(x)$ to be $R_{t \to t-1}^{Intra}$, where $2 \leq t \leq N$ and $R_{t \to t-1}^{Intra}$ is a 4×4 matrix with a fourth column as translations. Using this estimated transformation, $I_t(x)$ may be rapidly transformed to $I'_t(x)$. These operations may be repeated until a last time-point image $I_N(x)$ of the subject is aligned as $I'_N(x)$. After rigid alignment, the 4D representation of the subject is reconstructed from the rigidly aligned temporally successive 3D images of the subject.

It is contemplated that any rigid alignment method may be used as long as the method compensates for misalignment between two or more images of plural temporally successive 3D images of the subject.

After reconstruction of the rigidly aligned plural temporally successive 3D images of the subject at operation 120, the 4D representation of the subject may be linearly transformed to the 4D template, at operation 130, to desirably remove inter-subject size and pose differences of the 3D images of the subject before warping the 4D template to the 4D representation of the subject and to facilitate a subsequent non-rigid image registration of the 4D template and the 4D representation of the subject.

The linear transformation of the 4D representation of the subject to the 4D template may be, for example, an affine transformation. To determine an appropriate affine transformation, regular moments of the first time-point image $I'_1(x)$ of the 4D template and the 4D representation of the subject may be used to calculate respective eigenvectors and eigenvalues and to estimate a relative 3D linear transformation between the 4D template and the 4D representation of the subject. The estimated 3D transformation is applied to all 3D images of the subject, $\{I'_t(x) | 1 \leq t \leq N\}$. Thus, the 4D representation of the subject is linearly transformed to the 4D template, thereby producing a linearly transformed 4D representation of the subject. The 3D linear transformation may be denoted by, for example, a 4×4 matrix $R^{Inter}$, with the fourth column as translations. This means that the 3D image $I_t(x)$ of the subject may be transformed to the 4D template by a total transformation $R^{Inter}R_{t \to t-1}^{Intra}$ for $2 \leq t \leq N$, and by $R^{Inter}$ for t=1. It is preferable to avoid interpolation errors when concatenating multiple transformations by directly transforming the 3D images $I_t(x)$ of the subject to the 4D template using combined transformations $R^{Inter}R_{t \to t-1}^{Intra}$ for time-points $2 \leq t \leq N$, and using $R^{Inter}$ for the first time-point t=1. For convenience, S(x,t) is used to denote the linearly transformed 4D representation of the subject, and $S_t(x)$ is used to represent a respective 3D image of the linearly transformed 4D representation of the subject at time-point t.

After linearly transforming the 4D representation of the subject to the 4D template at operation 130, correspondences between the four dimensional representation of the subject and the 4D template may be established according to similarities of the determined spatiotemporal attribute vectors for a plurality of points of the linearly transformed 4D representation of the subject and of the 4D template at operation 140.

To establish the correspondences between the four dimensional representation of the subject and the four dimensional template, spatiotemporal attribute vectors may be determined for a plurality of points of the linearly transformed 4D representation of the subject and the 4D template, and correspondences between the 4D representation of the subject and the 4D template may be established for the plurality of points according to correspondences between the determined spatiotemporal attribute vectors of the 4D representation of the subject and the 4D template.

Spatiotemporal attribute vectors describe a set of temporally successive voxels. The spatiotemporal attribute vector may, for example, reflect the underlying anatomy of the temporally successive voxels at the different scales and may include morphological characteristics such as edge types, image intensity, and GMIs.

The spatiotemporal attribute vector for a respective point may be constructed using, for example, three vectors $a_1(x,t)$, $a_2(x,t)$, $a_3(x,t)$. That is $$a(x,t)=[a_1(x,t)a_2(x,t)a_3(x,t)] \quad (1)$$

The first vector $a_1(x,t)$, for example, with respect to brain morphology, may represent the edge type of the respective point (x,t) in the 4D representation of the subject or 4D template. $a_1(x,t)$ may take one of seven discrete values, corresponding to seven edge types of the brain such as nonedge and six combinations of edges between gray matter (GM), white matter (WM), and cerebrospinal fluid (CSF).

The second vector $a_2(x,t)$, for example, with respect to the brain morphology, may represent an intensity of the respective point (x,t). For convenience, $a_2(x,t)$ may be normalized to a range between 0 and 1.

The third vector $a_3(x,t)$ may include a set of geometric moment invariants (GMIs). GMIs are a way to characterize geometric properties of objects in image, because objects of different shapes tend to have different GMIs.

Each point in the 4D representation of the subject and 4D template carries its own morphological signature and a spatiotemporal attribute vector a(x,t) is designed to be as distinctive as possible of its respective point. This facilitates an automated matching process which may be completed without any human intervention. GMIs at a particular scale may be calculated by placing a spatiotemporal neighborhood (i.e., a 4D subvolume) located around respective points, and calculating a number of parameters that are invariant to rotation. A spatial radius of the spatiotemporal neighborhood defines the scale of the GMIs. GMIs are evaluated at different scales (i.e., for different spatiotemporal neighborhood sizes), and are concatenated into the spatiotemporal attribute vector of the respective points.

It is contemplated that other techniques such as Gabor filters, wavelets, and low-frequency representations may also be applied to provide geometric features/image attributes of the respective points. It is desirable that the concatenated attributes be rotation invariant because, for example, in brain morphology, it is desirable that a particular features, for example, sulcus or gyrus be properly detected, regardless of their orientation in an image.

Having defined the spatiotemporal attribute vector, correspondence between respective points on the 4D template and on the 4D representation of the subject may be established by evaluation and matching operations. The evaluation operation evaluates one or more measures of similarity of spatiotemporal attribute vectors for the plurality of points of the 4D template to spatiotemporal attribute vectors of the plurality of points of the linearly transformed 4D representation of the subject. Further, the matching operation matches each respective point of the 4D template to a respective point of the linearly transformed 4D representation of the subject, when the respective one or more measures of similarity of the point of the 4D template to the respective point of the linearly transformed 4D representation of the subject are largest among the evaluated one or more measures of similarity, and each of the respective one or more measures of similarity is, respectively, larger than one or more predetermined values.

It is desirable that the matching of respective points of the linearly transformed 4D representation of the subject and the 4D template minimize a cost function, E given below:

$$E = E_F + E_B + E_S \quad (2)$$

where $$E_F = \sum_{t=1}^{N} \sum_{x \in V_T} \omega_T(x,t) \left( \frac{\sum_{(z,\tau) \in n(x,t)} \varepsilon_T(z,\tau)(1 - m(a_T(z,\tau), a_S(h(z,\tau))))}{\sum_{(z,\tau) \in n(x,t)} \varepsilon_T(z,\tau)} \right) \quad (3)$$

$$E_B = \sum_{t=1}^{N} \sum_{x \in V_S} \omega_S(x,t) \left( \frac{\sum_{(z,\tau) \in n(x,t)} \varepsilon_S(z,\tau)(1 - m(a_T(h^{-1}(z,\tau)), a_S(z,\tau)))}{\sum_{(z,\tau) \in n(x,t)} \varepsilon_S(z,\tau)} \right) \quad (4)$$

$$E_S = \alpha \cdot E_S^{Spatial} + \beta \cdot E_S^{Temporal} \quad (5)$$

$$E_S^{Spatial} = \sum_{t=1}^{N} \sum_{x \in V_T} \left\| u(x,t) - \frac{\sum_{z \in n(x)} g_1(\|z-x\|) u(z,t)}{\sum_{z \in n(x)} g_1(\|z-x\|)} \right\|^2 \quad (6)$$

$$E_s^{Temporal} = \sum_{x \in V_T} \sum_{t=1}^{N} \left\| u(x,t) - \frac{\sum_{\tau \in n(t)} g_2(\tau-t) u(x,t)}{\sum_{\tau \in n(t)} g_2(\tau-t)} \right\|^2 \quad (7)$$

A first term $E_F$ measures the dissimilarity of the spatiotemporal attribute vectors in a vicinity of a respective point (x,t) under consideration, and it is therefore guiding an identification of anatomical correspondences. The first term $E_F$ is based on a forward transformation $h(\cdot)$ from the 4D template to the 4D representation of the subject. For each 4D template point (x,t), the spatiotemporal attribute vector differences are integrated in its 4D subvolume (i.e., spatiotemporal neighborhood), denoted by n(x,t). Point (z,τ) is a neighboring point. $a_T(z,\tau)$ is the spatiotemporal attribute vector of the 4D template point (z,τ), and $a_S(h(z,\tau))$ is the spatiotemporal attribute vector of the corresponding point h(z,τ) of the 4D representation of the subject. $m(\cdot,\cdot)$ is the similarity of two spatiotemporal attribute vectors, and ranges from 0 to 1. Thus, $(1-m(\cdot,\cdot))$ is the difference of the two spatiotemporal attribute vectors. $\varepsilon_T(z,\tau)$ is a weighting parameter for respective points in the 4D neighborhood of the 4D template; large weights may be used for salient points, such as boundary points. $\omega_T(x,t)$ denotes an importance weight of the 4D template point (x,t) for image matching. Importance weights $\omega_T(x,t)$, that are large, may be assigned to the respective points of the 4D template with distinctive spatiotemporal attribute vectors. The assignment of the importance weights $\omega_T(x,t)$ to the respective points of the 4D template allows the algorithm to focus on the more distinctive points.

A second term $E_B$ is similar to the first term $E_F$, but it is defined on the inverse transformation $h^{-1}(\cdot)$ from the 4D representation of the subject to the 4D template. The second term $E_B$ is used to constrain inverse consistency of the forward transformation $h(\cdot)$. The first and second terms $E_F$ and $E_B$ together favor transformations that yield mutually compatible results when deforming the 4D template to the 4D representation of the subject.

A third term $E_S$ is a smoothing constraint for a displacement field u(x,t), defined on a 4D template space $V_T$. A respective displacement field u(x,t) that differs significantly from an average displacement field in the 4D neighborhood can be penalized. However, selection of the smoothing operators is application dependent. For example, two smoothness components may be implemented: a spatial smoothing component $E_S^{Spatial}$, and a temporal smoothing component, $E_S^{Temporal}$. Moreover, the spatial and temporal smoothing components, $E_S^{Spatial}$ and $E_S^{Temporal}$ may be weighed by weighting parameters α and β, respectively.

After correspondences between the linearly transformed 4D representation of the subject and the 4D template are established at operation 140, the four dimensional subvolumes located around respective points of the 4D template are deformed according to relative positions of the established corresponding points of the 4D representation of the subject and of the 4D template to provide a deformed 4D template at operation 150.

After the 4D subvolumes located around respective points of the 4D template are deformed at operation 150, the deformed 4D template is smoothed at operation 160.

A Gaussian filter $g_1$ may be used in the spatial smoothing component, to obtain the average displacement in a 3D spatial neighborhood n(x). A second Gaussian filter $g_2$ may be used in the temporal smoothing component to obtain an average displacement in a 1D temporal neighborhood n(t). By selecting different sizes of the 1D temporal neighborhood and a standard deviation for the second Gaussian filter $g_2$, different degrees of smoothness on the displacement fields u(x,t) along the temporal dimension may be obtained. The variance of the Gaussian filter $g_1$, used for smoothing spatial deformation for brain images, ranges from about 1.0 mm to 15.0 mm but is application specific and the variance of the Gaussian filter $g_1$, used for temporal smoothing, ranges from 1 to the total number of temporal images (i.e., 10 if there are ten temporal images existing for a subject).

Moreover, it may be desirable to use a Laplacian in only spatial domain for spatially smoothing deformation fields.

The Laplacian is used as a local elastic constraint and may be simultaneously applied with a Gaussian smoothing kernel in the spatial domain to ensure that the deformation fields are spatially smooth. The Laplacian is obtained by subtracting the Gaussian filtered voxels from the input voxels.

Although the generating of the 4D template at operation 100 is illustrated as preceding operations 110 to 130, the generated 4D template is used in the establishing of correspondences operation at 140. Thus, the generation of the 4D template at operation 100 may occur at any point in the atlas mapping method, so long as the generating of the 4D template occurs prior to the establishing of correspondences operation at 140.

Figure 2:
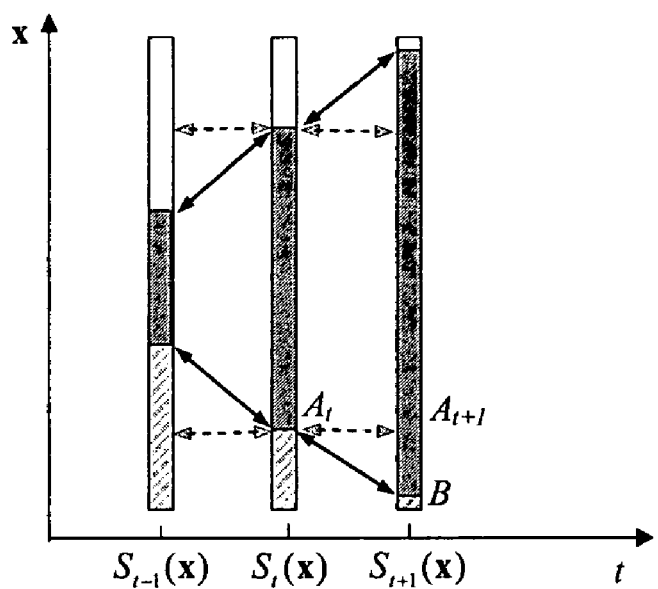
FIG. 2 is a schematic diagram illustrating an operation which may be used in the methods illustrated in FIG. 1 or 4 to establish a spatiotemporal (i.e., 4D) subvolume in the 4D representation of a subject. For simplicity, only one spatial dimension is shown in the schematic diagram.
Figure 4:
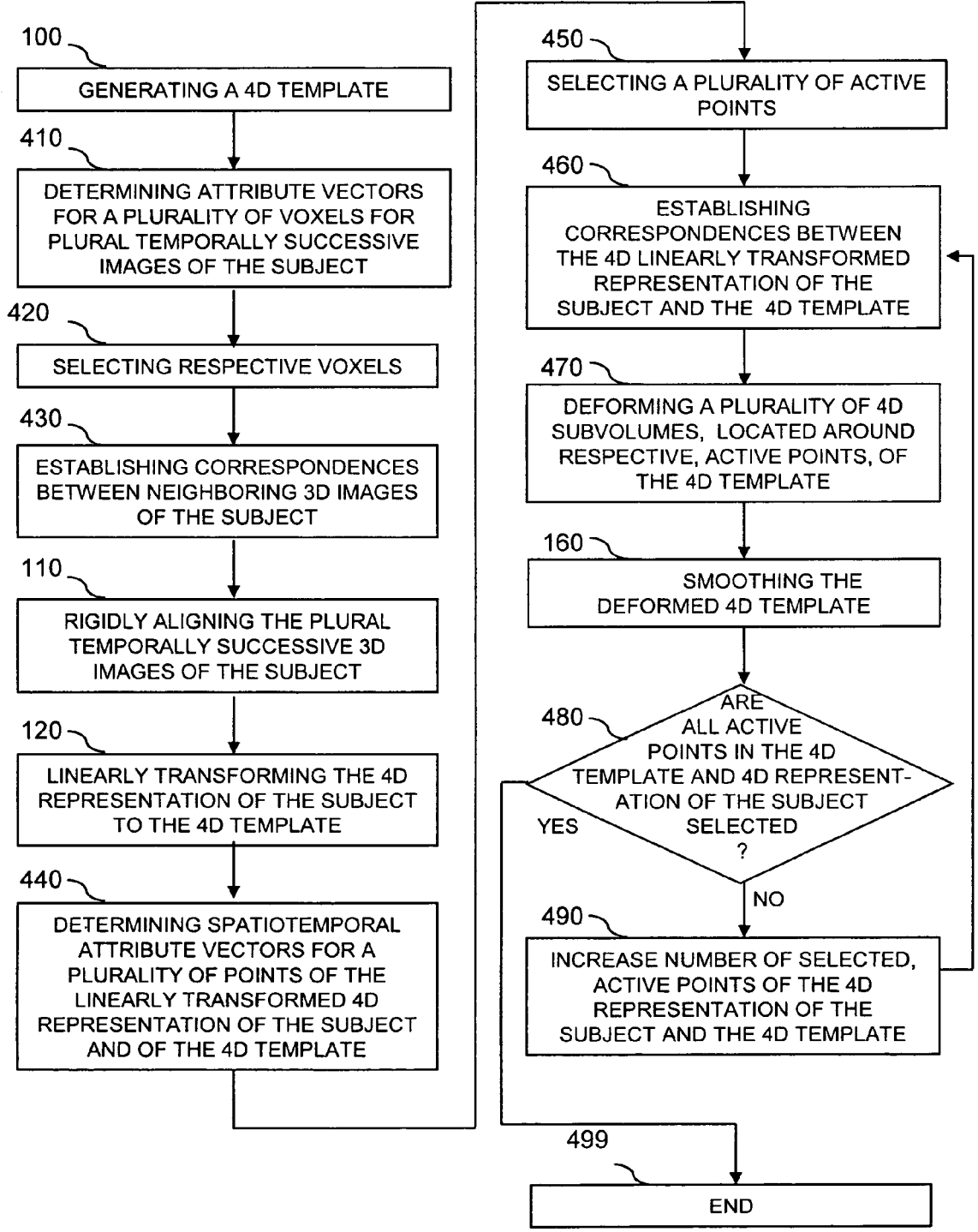
FIG. 4 is a flow chart of a method in accordance with a second embodiment of the present invention.

FIG. 2 is a schematic diagram illustrating an operation used in either of the methods illustrated in of FIG. 1 or 4 to establish a spatiotemporal (i.e., a 4D) subvolume for the representation of a subject. For simplicity, only one spatial dimension is shown in the schematic diagram.

Referring to FIG. 2, successive temporal 3D images of the subject, such as $S_t(x)$ and $S_{t+1}(x)$, are not necessarily continuous and smooth along the temporal dimension, as shown schematically in FIG. 2. This can be due to longitudinal changes that may occur between two consecutive scans which produce the successive temporal 3D images of the subject, but may also be due to small misalignment errors. For example, according to a 4D coordinate system, a first point $A_{t+1}$ in the 3D image $S_{t+1}(x)$ of the subject appears to be an immediate temporal neighbor of a second point $A_t$ in the 3D image $S_t(x)$ of the subject. However, an actual corresponding neighbor of the second point $A_t$, in the 3D image $S_{t+1}(x)$ of the subject is a third point B. If correct neighboring points that are used in equation (1), are not properly determined, then atlas mapping performance accuracy will be significantly diminished. For example, under the above-described conditions total attribute difference/similarity may be integrated based on points that are not actually in the temporal neighborhood, and the deformation fields u(x,t) may be smoothed incorrectly along the temporal dimension. Accordingly, in preferred embodiments of the invention, the correspondences between the neighboring 3D images of the subject in the 4D representation of the subject S(x,t) are established, and then these correspondences are used to rebuild a new temporal neighborhood structure. The new temporal neighborhood structure is used in an operation to minimize the cost function in equation (1).

Figure 3:
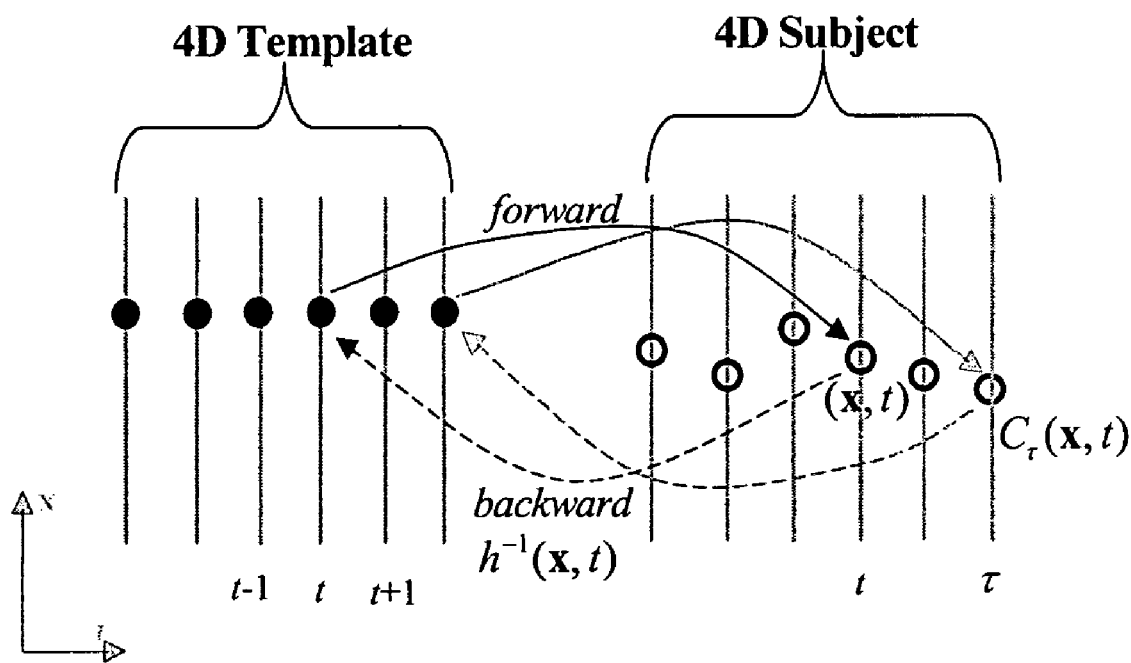
FIG. 3 is a schematic diagram illustrating a constraint which may be used in the methods illustrated in FIG. 1 or 4 to provide temporal smoothness.

FIG. 3 is a schematic diagram illustrating a constraint that may be used in either of the methods illustrated in FIG. 1 or 4 to provide temporal smoothness.

Referring to FIG. 3, in the 4D representation of the subject S(x,t), the positions of the corresponding points are not always smooth along the temporal dimension (See FIG. 2). However, this is not the case in the exemplary 4D template T(x,t), since this 4D template is constructed by repeating the 3D template of the first time-point for all time-points. Conventional smoothness constraints for a 4D space cannot be applied, because such constraints would ignore inevitable misalignments of the temporally successive 3D images of the subject that manifest themselves as high-frequency noise which, if removed, may smooth out important morphological characteristics of this subject.

Accordingly, smoothness constraints may be imposed for the 4D template space only. That is, if the backward transformation is followed (i.e., the transformation from the 4D representation of the subject to the 4D template), absolute agreement in the temporal dimension may be imposed as a condition for establishing correspondences between respective points in the 4D template and the 4D representation of the subject. This means that no temporal warping is allowed, because the time-points of image acquisitions are known in advance and, further, means that a temporally smooth warping field can be obtained. This constraint is part of the optimization and matching operations, which may be mathematically formulated as:

$$E_s^{Temporal} = \sum_{x \in V_S} \sum_{t=1}^{N} \left( h^{-1}(x,t) - \frac{\sum_{\tau \in n(t)} g_2(\tau-t) h^{-1}(C_\tau(x,t),\tau)}{\sum_{\tau \in n(t)} g_2(\tau-t)} \right)^2 \quad (7)$$

where $h^{-1}(x,t)$ is the backward transformation on point (x,t) of the subject. $C_\tau(x,t)$ denotes the temporal correspondence of the point (x,t) of the subject $S_\tau T(x)$ in the image of time-point $\tau$, $S_\tau(x)$.

As shown in FIG. 3, positions of the corresponding points in the 4D template are very smooth along the temporal dimension. However, positions of corresponding points in the 4D representations of the subject are not always continuous and smooth along the temporal dimension.

FIG. 4 is a flow chart of a method of atlas mapping in accordance with a second embodiment of the present invention. For brevity operations common to the first and second embodiments are only briefly described below.

Referring to FIG. 4, a 4D template is generated at operation 100. To generate the 4D template, a 3D reference image of one time-point may be repeated to construct the 4D template. Thus, the 4D template may desirable be used as a measurement unit, relative to which longitudinal changes of a 4D representation of the subject may be measured.

After the 4D template is generated at operation 100, spatial attribute vectors for the plurality of voxels of plural temporally successive 3D images of the subject are determined at operation 410. One method for establishing such spatial attribute vectors is set forth in the Hammer publication by the inventors.

Spatiotemporal attribute vectors describes a set of voxels of a 3D image (i.e., three spatial dimensions). The spatial attribute vector may, for example, reflect the underlying anatomy of the voxel at the different scales and may include morphological characteristics such as edge types, image intensity, and GMIs.

The spatiotemporal attribute vector for a respective voxel may be constructed using, for example, three vectors $a_1(x)$, $a_2(x)$, $a_3(x)$. That is $$a(x) = [a_1(x) a_2(x) a_3(x)] \quad (1)$$

The first vector $a_1(x)$, for example, with respect to brain morphology, may represent the edge type of the respective voxel (x) in a 3D image of the subject. $a_1(x)$ may take one of seven discrete values, corresponding to seven edge types of the brain such as nonedge and six combinations of edges between gray matter (GM), white matter (WM), and cerebrospinal fluid (CSF).

The second vector $a_2(x)$, for example, with respect to the brain morphology, may represent an intensity of the respective voxel (x). For convenience, $a_2(x)$ may be normalized to a range between 0 and 1.

The third vector $a_3(x)$ may include a set of geometric moment invariants (GMIs). GMIs are a way to characterize geometric properties of objects in image, because objects of different shapes tend to have different GMIs.

Each voxel in the 3D image of the subject carries its own morphological signature and a spatial attribute vector a(x) is designed to be as distinctive as possible of its respective voxel. This facilitates an automated matching process which may be completed without any human intervention. GMIs at a particular scale may be calculated by placing a spatial neighborhood (i.e., a 3D subvolume) located around respective voxels, and calculating a number of parameters that are invariant to rotation. A spatial radius of the spatiotemporal neighborhood defines the scale of the GMIs. GMIs are evaluated at different scales (i.e., for different spatiotemporal neighborhood sizes), and are concatenated into the spatial attribute vector of the respective points.

After spatial attribute vectors for a plurality of voxels for plural temporally successive 3D images of the subject are determined at operation 410, respective voxels based on the determined spatial attribute vectors for the plurality of voxels are selected at operation 420. The plurality of voxels may be selected based on user input, based on measures of dissimilarity between a respective voxel and its neighboring voxels or based on boundary types of the respective voxels, among others.

The selection of the voxels may be determined according to distinctiveness of the spatial attribute vector, for example, which is learned from one or more sets of training images. In order to evaluate a candidate match, a 3D subvolume (i.e., a neighborhood located around the respective voxel) may be defined to assess goodness of fit of the spatial attribute vectors of the 3D subvolume.

It is contemplated that a variety of operations can be used to select and rank active points by distinctiveness. These operations may include manual, user-drive procedures, expert-trained selection procedures or completely automated procedures based on comparisons of the spatial attribute vectors. In expert-trained selection procedures distinctive anatomical points, such crown of cortical gyri or roots of cortical sulci in the brain of the subject may be identified by experts. The ranges of spatial attribute vectors of these expert-defined distinctive active points then may be determined, and may be subsequently used in a completely automated procedure where the ranges are applied to new images (i.e., after the training stage). Automated criteria may include inverse consistency, e.g. voxels that yield consistent anatomical or functional matches between two images, regardless of the way in which the matching criterion is evaluated (regardless of whether the transformation is in the forward or backward direction). In other cases, consistency among all images or among randomly selected subsets of images may be evaluated. Another automated criterion may be that of uniqueness, which is most effective yet computationally extensive. When the uniqueness criterion is evaluated, not only is it desirable for a point in a first image to be a good match for a point in a second image, but also other points in neighborhoods of these two points are desirably not good matches.

After the respective voxels are selected at operation 420, correspondences between neighboring 3D images of the subject are established at operation 430

Correspondences between neighboring 3D images of the subject may be established according to similarities of the respective, selected voxels for the plural temporally successive 3D images of the subject.

After the correspondences between neighboring 3D images of the subject are established at operation 430, the plural temporally successive 3D images of the subject may be rigidly aligned according to the established correspondences between the neighboring 3D images of the subject at operation 110. The rigidly aligned plural temporally successive 3D images are the 4D representation of the subject.

After the plural temporally successive 3D images of the subject are rigidly aligned at operation 110, the 4D representation of the subject may be linearly transformed to the 4D template at operation 120.

After the 4D representation of the subject to the 4D template are linearly transformed at operation 130, the spatiotemporal attribute vectors for a plurality of points of the linearly transformed 4D representation of the subject and the 4D template may be determined at operation 440.

The spatiotemporal attribute vectors of this embodiment and that of the embodiment in FIG. 1 may have a common construction. Thus, a description of the spatiotemporal attribute vector of this embodiment is omitted for brevity.

After the spatiotemporal attribute vectors for a plurality of points of the linearly transformed 4D representation of the subject and the 4D template are determined at operation 440, a plurality of active points from the points of the linearly transformed 4D representation of the subject, and a plurality of active points from the points of the four 4D according to the determined spatiotemporal attribute vectors are selected at operation 450. The plurality of active points may be selected based on user input, based on measures of dissimilarity between respective active points and neighboring active points of the 4D template or based on boundary types of the respective points, among others.

In one embodiment of the invention, active points may be selected according to distinctiveness of their respective spatiotemporal attribute vectors, which may be learned, for example, from one or more training set of images. In order to evaluate a candidate match, a 4D subvolume (i.e., a neighborhood located around the respective active point) may be defined and warped towards the subject, to assess goodness of fit of the spatiotemporal attribute vectors of the 4D subvolume.

After the plurality of active points are selected at operation 450, correspondences between the 4D representation of the subject and the 4D template may be established according to similarities among the selected plurality of active points at operation 460. That is, correspondences among the 4D representation of the subject and the 4D template may be established for the selected plurality of active points according to correspondences among of the determined spatiotemporal attribute vectors of the 4D representation of the subject and the 4D template.

Moreover, the correspondences between respective points on the 4D template and on the 4D representation of the subject may be established by evaluating one or more measures of similarity of spatiotemporal attribute vectors for the plurality of active points of the 4D template to spatiotemporal attribute vectors of the plurality of active points of the linearly transformed 4D representation of the subject. Next each respective, selected active point of the 4D template is matched to a respective, selected active point of the linearly transformed 4D representation of the subject. This is done when the respective one or more measures of similarity of the respective, selected active point of the 4D template to the respective, selected active point of the linearly transformed 4D representation of the subject are largest among the evaluated one or more measures of similarity, and each of the respective one or more measures of similarity is, respectively, larger than one or more predetermined values.

More particularly, the correspondences between the respective, selected active points on the 4D template and the 4D representation of the subject may be established by hierarchically minimizing the cost function, E given in equation (2)

It is desirable that the assignment of the importance weights $\omega_T(x,t)$ in cost function E to the respective points of the 4D template allow the deforming operation 470 to focus initially only on respective points (i.e., selected, active points) having large importance weights (i.e., distinctive points). Furthermore, by hierarchically assigning weights to the 4D template points, the 4D template may be able to be hierarchically deformed (through an iterative process, see operations 490 and 495). Moreover, a size of 4D neighborhood n(x,t) preferably may be held at a large predetermined initially size and may decrease gradually with a progression of the deformation of the 4D template at operation 470. This improves robustness and accuracy of such an algorithm and allows the algorithm to avoid being trapped into local minima or maxima.

After correspondences between the linearly transformed 4D representation of the subject and the 4D template are established at operation 460, the 4D subvolume, located around respective, active points of the 4D template are deformed according to relative positions of the established corresponding active points of the 4D representation of the subject and of the 4D template to provide a deformed 4D template at operation 470.

The 4D template is warped to the 4D representation of the subject by matching the spatiotemporal attribute vectors of a number of the active points. These may be points with relatively distinctive attribute vectors, that can be identified relatively more reliably based on their morphological signatures, compared to other points.

The deformation of the 4D template T(x,t) to the 4D representation of the subject S(x,t) is driven by hierarchically selected active points, and enables the establishment of correspondences and the deformation of the 4D template with improved speed, while reducing local minima. These local minima may, in part, result from ambiguities in the establishment of corresponding pairs of points. Some structures, for example, brain structures, have very distinctive spatiotemporal attribute vectors, (e.g., roots of sulci and crowns of the gyri which can be identified more reliably than other cortical points). Therefore, in the deformable matching operation, candidate matches of points with distinctive spatiotemporal attribute vectors are evaluated, and then points with less distinctive spatiotemporal attribute vectors are evaluated. Effectively, this operation approximates a very high-dimensional (equal to a number of points in a 4D image) cost function, using a significantly lower dimensional cost function of only the active points. Moreover, the significantly lower dimensional cost function has few local minima.

The points of the 4D template and the 4D representation of the subject may be ranked according to distinctiveness of the spatiotemporal attribute vectors, and the top-ranked points of the 4D template and the 4D representation of the subject may be selected as the active points to drive initial deformation of the 4D template to the 4D representation of the subject. As the deformation progresses, lower-ranked points may be added to the active points, to further deform the 4D template to the 4D representation of the subject. In a final stage of deformation of the 4D template to the 4D representation of the subject, all points in the template may be used as the active points to drive the deformations of the 4D template to the 4D representation of the subject.

A desirable characteristic of the matching operation is that the transformation to establish correspondences among active points in the 4D template and the 4D representation of the subject is inverse-consistent. A transformation is inverse consistent if it finds consistent results between matching the 4D template to the 4D representation of the subject (i.e., the forward transformation) and matching the 4D representation of the subject to the template. Typically, however, automated image warping techniques are not inverse consistent. In embodiments of the present invention, inverse consistency may be enforced only on the active points, as the warping transformation for points which are not active points is determined via interpolation from the active points.

To increase robustness against false matches of the active points, similarity of spatiotemporal attribute vectors in an entire 4D subvolume (i.e., 4D neighborhood) around an active point is evaluated. Thus, for each 4D template active point, plural target points with similar spatiotemporal attribute vectors in a 4D neighborhood of the active point are compared for possible matching thereof. For each of the active points that match, the one or more measures of similarity of spatiotemporal attribute vectors in respective 4D subvolumes may desirably be evaluated. For example, it is unlikely that all points in a spatial neighborhood and also in a temporal neighborhood have matching spatiotemporal attribute vectors, unless this is a true match. The point in the 4D representation of the subject that presents a highest subvolume-derived measure of similarity of the spatiotemporal attribute vector, is defined as a correspondence, provided that the measure of similarity is larger than a predetermined threshold value. This predetermined threshold comparison prevents active points that do not have good matches from actively deforming the 4D template. Multiple levels of evaluation of goodness of correspondence add robustness to the deformation operation at 470, and are preferable for complex structures such as in the human brain anatomy. Further, correspondences in the backward transformation direction, i.e., from the 4D representation of the subject to the 4D template, are also evaluated. If the backward transformation direction correspondences are inconsistent with those of the forward direction described above, then a compromise is reached so that inverse consistency is satisfied.

As bigger structures tend to dominate over smaller structures, simply because these structures contribute more active points, it is preferable that a spatially adaptive mechanism be implemented to select proportionately more active points from small structures.

The 4D template is warped to the 4D representation of the subject by matching the spatiotemporal attribute vectors of a number of the active points. These may be points with relatively distinctive attribute vectors, that can be identified relatively more reliably based on their morphological signatures, compared to other points.

After the 4D subvolumes, located around the respective active points of the 4D template are deformed at operation 470, the deformed 4D template is smoothed at operation 160.

After the deformed 4D template is smoothed at operation 160, it is determined whether all of the points in the deformed 4D template are selected as the active points and all of the points of the linearly transformed 4D representation of the subject are selected as the active points at operation 480.

If it is determined that all of the points in the deformed 4D template are selected as the active points and all of the points of the linearly transformed 4D representation of the subject are selected as the active points at operation 480, then the procedure ends at operation 499, or, otherwise, a number of the selected active points in the linearly transformed 4D representation of the subject and the deformed 4D template is increased at operation 490 and the establishing operation at 460, the deforming operation at 470, the smoothing operation at 160 and the determining operation at 480 are repeated.

It may be desirable to adjust a size of the plurality of 4D subvolumes after each repetition of operations 460, 470, 160 and 480 until the plurality of the 4D subvolumes includes only immediately neighboring active points. Thus, the atlas mapping method of this embodiment may be applied in a hierarchical way. In particular, a 4D subvolume size may be initially very large, since at an initial stage of deformation there are only a few 4D template active points distributed sparsely in the 4D template. The 4D subvolume size may decrease gradually as the atlas mapping progresses. That is, the 4D subvolume size may be reduce to include only immediate neighbors in final stages of the deformation. In the atlas mapping method, a range of the temporal dimension is usually much smaller than ranges of the spatial dimensions (such as 256×256×124). Accordingly, the 4D subvolume may be designed to be flat in the temporal dimension. A size of the Gaussian interpolation filters used to smear displacements of the active points to the remainder of the 4D volume may be designed to become progressively smaller, as the density of the active points increases.

Although the generating of the 4D template at operation 100 is illustrated as preceding operation 410, the generated 4D template is used in the determining operation at 440. Thus, the generation of the 4D template at operation 100 may occur at any point in the atlas mapping method, so long as the generating of the 4D template occurs prior to the determining operation at 440.

FIG. 5 is a block diagram of an atlas mapping system for providing an atlas map using either of the methods illustrated in FIG. 1 or 4. The atlas mapping system comprises a scanner 500, a central processing unit (CPU) 510, input and output (I/O) devices 520, a memory unit 530 and a communication channel 540.

The scanner 500, the central processing unit (CPU) 510, the input and output (I/O) devices 520 and the memory unit 530 communicate with each other via the communication channel 540.

The scanner 500 may be, for example, a CAT scan device, a MRI scanner, a PET scanner or a digital image device, among others that scans two dimensional or 3D images of a subject. The scanned two dimensional or 3D images of the subject are transmitted from the scanner 500 to the memory unit 530 and/or the CPU 510 according to control commands from either the CPU 510 or a respective input and output (I/O) device 520. The memory unit 530 stores the two-dimensional or 3D images for subsequent transmission to the CPU 510.

The CPU 510 generally performs computational processing in the atlas mapping system according to either of the embodiments of the invention illustrated in FIG. 1 or FIG. 4. That is, the CPU 510 may perform the operations illustrated in FIGS. 1 and 4 according to software instructions executed on the CPU 510. The CPU 510 may also receive the scanned two dimensional or 3D images of the subject from the scanner 500 or the memory unit 530 and/or may receive and transmit signals to the input/output devices 520.

The memory unit 530 and CPU 510 include a computer readable carrier, i.e., RAM memory, magnetic or optical drive or diskette, or audio frequency radio frequency or optical frequency carrier wave among others, which can store program codes to execute in either of the methods illustrated in FIGS. 1 and 4.

Although the present invention is implemented in terms of an atlas mapping operation to warp a 4D reference (i.e., template) to a 4D representation of the subject, the resulting atlas mapping operation can be adapted to two dimensional temporally successive image processing.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of atlas mapping rigidly aligned temporally successive N−1 dimensional images of a subject, which form a N dimensional representation of the subject including one temporal dimension, where N is an integer number greater than 2, the method comprising:

generating a N dimensional template;

generating attribute vectors for a plurality of points of the N dimensional representation of the subject and of the N dimensional template, each point of the plurality of points including a plurality of temporally successive voxels of the N dimensional representation of the subject and of the N dimensional template;

evaluating the generated attribute vectors associated with the plurality of points to identify points in the N dimensional template that correspond to respective points in the N dimensional representation of the subject, each of the generated attribute vectors being based on attributes of the plurality of temporally successive voxels; and deforming the N dimensional template to the N dimensional representation of the subject according to relative positions of the respective corresponding points of the N dimensional representation of the subject and of the N dimensional template.

2. The method according to claim 1, wherein N equals four, the method further comprising:

selecting points in the four dimensional template according to measures of distinctiveness among the evaluated attribute vectors of the four dimensional template, wherein the deforming of the four dimensional template is based on the selected points.

3. The method according to claim 1, wherein N equals four and the four dimensional template is a four dimensional representation of a reference and corresponds to the four dimensional representation of the subject.

4. The method according to claim 1, wherein N equals four and the four dimensional template is an atlas of a brain.

5. The method according to claim 1, wherein N is either 3 or 4.

6. The method according to claim 1, further comprising:

linearly transforming the N dimensional representation of the subject to the N dimensional template such that the linearly transformed N dimensional representation of the subject is used to generate the attribute vectors.

7. A method of atlas mapping of rigidly aligned temporally successive three dimensional images of a subject, which form a four dimensional representation of the subject, the method comprising:

generating a four dimensional template;

linearly transforming the four dimensional representation of the subject to the four dimensional template;

determining attribute vectors for a plurality of points of the linearly transformed four dimensional representation of the subject and of the four dimensional template, the plurality of points corresponding to a plurality of temporally successive voxels of the four dimensional representation of the subject and of the four dimensional template;

establishing correspondences between the four dimensional representation of the subject and the four dimensional template according to similarities between the determined attribute vectors of the plurality of points of the linearly transformed four dimensional representation of the subject and of the four dimensional template;

deforming a plurality of four dimensional subvolumes located around respective points of the four dimensional template according to relative positions of the corresponding points of the linearly transformed four dimensional representation of the subject and of the four dimensional template to provide a deformed four dimensional template; and smoothing the deformed four dimensional template.

8. The method according to claim 7, wherein the determining of the attribute vectors comprises:

determining respective edge types, image intensities, wavelet expansion coefficients, and geometric moment invariants of the plurality of points of the linearly transformed four dimensional representation of the subject and of the four dimensional template.

9. The method according to claim 8, wherein the determining of the geometric moment invariants for the plurality of points comprises:

determining a plurality of four dimensional subvolumes located around respective ones of the plurality of points of the linearly transformed four dimensional representation of the subject and of the four dimensional template;

calculating predetermined parameters that are invariant to rotation for the respective ones of the plurality of points of the linearly transformed four dimensional representation of the subject and of the four dimensional template according to the determining of the four dimensional subvolumes; and repeating the determining of the plurality of four dimensional subvolumes and the calculating of the predetermined parameters operations while adjusting the four dimensional subvolumes in size.

10. The method according to claim 9, wherein the establishing of the correspondences between the linearly transformed four dimensional representation of the subject and the four dimensional template comprises:

evaluating one or more measures of similarity of attribute vectors for each selected point of the four dimensional template to attribute vectors of selected points of the linearly transformed four dimensional representation of the subject; and matching a respective, selected point of the four dimensional template to a respective, selected point of the linearly transformed four dimensional representation of the subject, when the respective one or more measures of similarity of the respective, selected point of the four dimensional template to the respective, selected point of the linearly transformed four dimensional representation of the subject are largest among the evaluated one or more measures of similarity, and each of the respective one or more measures of similarity is respectively larger than one or more predetermined threshold values.

11. The method according to claim 10, wherein the establishing of the correspondences between the linearly transformed four dimensional representation of the subject and the four dimensional template further comprises:

minimizing the following cost function;

$$E_F + E_B + \alpha \cdot E_S^{Spatial} + \beta \cdot E_S^{Temporal}$$

where $E_F$ is one measure of dissimilarity of a respective attribute vector of the four dimensional subvolume of the four dimensional template to a respective attribute vector of the four dimensional subvolume of the four dimensional representation of the subject, and includes at least one of the one or more measures of similarity, $E_B$ is another measure of dissimilarity of a respective attribute vector of the four dimensional subvolume of the four dimensional representation of the subject to a respective attribute vector of the four dimensional subvolume of the four dimensional template, and includes at least another one of the one or more measures of similarity, $\alpha$ and $\beta$ are two weighting parameters, $E_S^{Spatial}$ is a spatial smoothing component, and $E_S^{Temporal}$ is a temporal smoothing component.

12. The method according to claim 11, wherein $E_F$ which is the one measure of dissimilarity comprises:

$$E_F = \sum_{t=1}^{N} \sum_{x \in V_T} \omega_T(x, t) \left( \frac{\sum_{(z,\tau) \in n(x,t)} \varepsilon_T(z, \tau)(1 - m(a_T(z, \tau), a_S(h(z, \tau))))}{\sum_{(z,\tau) \in n(x,t)} \varepsilon_T(z, \tau)} \right)$$

where $a_T(z,\tau)$ is the attribute vector of the template point $(z,\tau)$, $a_S(h(z,\tau))$ is the attribute vector of the corresponding subject point $h(z,\tau)$, $1-m(a_T(z,\tau), a_S(h(z,\tau)))$ is a difference measure of the corresponding attribute vectors of the four dimensional template and of the four dimensional representation of the subject, $\epsilon_T(z,\tau)$ is a weighting parameter for the points of the four dimensional subvolume of the four dimensional template, and $\omega_T(x,t)$ is an importance parameter of a respective template point $(x,t)$.

13. The method according to claim 11, wherein $E_B$ which is the other one of the measures of dissimilarity comprises:

$$E_B = \sum_{t=1}^{N} \sum_{x \in V_S} \omega_S(x, t) \left( \frac{\sum_{(z,\tau) \in n(x,t)} \varepsilon_S(z, \tau)(1 - m(a_T(h^{-1}(z, \tau)), a_S(z, \tau)))}{\sum_{(z,\tau) \in n(x,t)} \varepsilon_S(z, \tau)} \right)$$

where $a_S(h(z,\tau))$ is the attribute vector of the subject point $h(z,\tau)$, $a_T(h^{-1}((z,\tau))$ is the attribute vector of the corresponding template point $(z,\tau)$ for the inverse transformation, $1-m(a_T(h^{-1}(z,\tau)), a_S(z,\tau))$ is a difference measure of the corresponding attribute vectors of the four dimensional representation of the subject and of the four dimensional template in the inverse transformation, $\epsilon_S(z,\tau)$ is a weighting parameter for the points of the four dimensional subvolume of the four dimensional representation of the subject, and $\omega_S(x,t)$ is an importance parameter of a respective subject point $(x,t)$.

14. The method according to claim 11, wherein $E_S^{Spatial}$ comprises:

$$E_S^{Spatial} = \sum_{t=1}^{N} \sum_{x \in V_T} \left\| u(x, t) - \frac{\sum_{z \in n(x)} g_1(\|z - x\|)u(z, t)}{\sum_{z \in n(x)} g_1(\|z - x\|)} \right\|^2$$

and $E_S^{Temporal}$ comprises:

$$E_S^{Temporal} = \sum_{x \in V_T} \sum_{t=1}^{N} \left\| u(x, t) - \frac{\sum_{\tau \in n(t)} g_2(\tau - t)u(x, \tau)}{\sum_{\tau \in n(t)} g_2(\tau - t)} \right\|^2$$

where $u(x,t)$ is a displacement field, $g_1$ is a Gaussian filter to obtain an average displacement in a three dimension spatial subvolume, and $g_2$ is a second Gaussian filter to obtain an average displacement in a one dimensional temporal subvolume.

15. The method according to claim 7, wherein the determining of the attribute vectors for the plurality of points of the linearly transformed four dimensional representation of the subject and of the four dimensional template comprises:

selecting the plurality of points according to at least one of user input, of measures of dissimilarity between the selected points and neighboring points or of boundary types of the selected points;

determining a four dimensional subvolume located around each selected point;

calculating for each selected point, predetermined parameters corresponding to the selected point that are invariant to spatial rotation of the selected point according to the determined four dimensional subvolume; and repeating the determining of the four dimensional subvolume and the calculating of the predetermined parameters operations while adjusting the four dimensional subvolume in size.

16. A method of atlas mapping of temporally successive three dimensional images of a subject, which form a four dimensional representation of the subject, the method comprising:

generating a four dimensional template;

establishing correspondences between neighboring three dimensional images of the subject according to determined attribute vectors for the plurality of voxels of plural temporally successive three dimensional images of the subject;

rigidly aligning the plural temporally successive three dimensional images of the subject according to the established correspondences between the neighboring three dimensional images of the subject, the rigidly aligned plural temporally successive three dimensional images being the four dimensional representation of the subject;

linearly transforming the four dimensional representation of the subject to the four dimensional template;

establishing respective correspondences between the four dimensional representation of the subject and the four dimensional template according to similarities of determined attribute vectors for a plurality of points of the linearly transformed four dimensional representation of the subject and of the four dimensional template, the plurality of points consisting of a plurality of temporally successive voxels of the four dimensional representation of the subject and of the four dimensional template;

deforming four dimensional subvolumes located around the points of the four dimensional template according to relative positions of points of the four dimensional representation of the subject and the respective points of the four dimensional template to provide a deformed four dimensional template; and smoothing the deformed four dimensional template.

17. The method according to claim 16, further comprising:

selecting the four dimensional subvolumes located around respective points of the four dimensional template according to measures of distinctiveness between the evaluated attribute vectors of the four dimensional template, wherein the deforming of the four dimensional template is based on the selected four dimensional subvolumes.

18. The method according to claim 16, wherein the linear transformation of the four dimensional representation of the subject to the four dimensional template is according to an affine transformation.

19. The method according to claim 16, wherein the generation of the four dimensional template, the establishment of correspondences between neighboring three dimensional images of the subject, the rigid alignment of the plural temporally successive three dimensional images of the subject, the linear transformation of the four dimensional representation of the subject, the establishment of the correspondences between the four dimensional representation of the subject and the four dimensional template, the deformation of the four dimensional subvolumes and the smoothing of the deformed four dimensional template operations automatically occur without human intervention.

20. A method of atlas mapping of temporally successive three dimensional images of a subject, which form a four dimensional representation of the subject, the method comprising the steps of:

a) generating a four dimensional template representing a reference and corresponding to the four dimensional representation of the subject;

b) determining spatial attribute vectors for a plurality of voxels for plural temporally successive three dimensional images of the subject;

c) selecting respective voxels based on the determined spatial attribute vectors for the plurality of voxels;

d) establishing correspondences between neighboring three dimensional images of the subject according to the selected, respective voxels for the plural temporally successive three dimensional images of the subject;

e) rigidly aligning the plural temporally successive three dimensional images of the subject according to the established correspondences between the neighboring three dimensional images of the subject to form the four dimensional representation of the subject;

f) linearly transforming the four dimensional representation of the subject to the four dimensional template;

g) determining spatiotemporal attribute vectors for a plurality of points of the linearly transformed four dimensional representation of the subject and the four dimensional template, the plurality of points consisting of a plurality of temporally successive voxels of the four dimensional representation of the subject and of the four dimensional template;

h) selecting a plurality of subject active points from among the points of the linearly transformed four dimensional representation of the subject, and a plurality of template active points from among the points of the four dimensional template according to the determined spatiotemporal attribute vectors;

i) establishing correspondences between the four dimensional representation of the subject and the four dimensional template according to similarities between the selected plurality of subject active points and template active points;

j) deforming a plurality of four dimensional subvolumes, located around respective, selected ones of the template active points according to relative positions of respective, selected ones of the subject active points to provide a deformed four dimensional template, when respective correspondences are established between the respective, selected active points of the linearly transformed four dimensional representation of the subject and the four dimensional template;

k) smoothing the deformed four dimensional template using a Gaussian filter; and
l) repeating the steps g through j, while increasing a number of the selected active points in the linearly transformed four dimensional representation of the subject and the deformed four dimensional template.

21. The method according to claim 20, wherein the repeating of the steps h through k comprises:
iteratively repeating steps g through j until all of the points of the deformed four dimensional template are selected as the active points thereof and all of the points of the linearly transformed four dimensional representation of the subject are selected as the active points thereof.

22. The method according to claim 20, wherein a size of the plurality of four dimensional subvolumes is decreased after each repetition of steps g through j until the plurality of the four dimensional subvolumes includes only immediately neighboring active points.

23. A computer readable memory for storing program code for causing a computer to implement a method of atlas mapping rigidly aligned temporally successive N−1 dimensional images of a subject, which form a N dimensional representation of the subject including one temporal dimension, where N is a integer number greater than 2, the method comprising:
generating a N dimensional template;
generating attribute vectors for a plurality of points of the N dimensional representation of the subject and of the N dimensional template, each point of the plurality of points including a plurality of temporally successive voxels of the N dimensional representation of the subject and of the N dimensional template;
evaluating the generated attribute vectors associated with the plurality of points to identify points in the N dimensional template that correspond to respective points in the N dimensional representation of the subject, each of the generated attribute vectors being based on attributes of the plurality of temporally successive voxels; and
deforming the N dimensional template to the N dimensional representation of the subject according to relative positions of the respective corresponding points of the N dimensional representation of the subject and of the N dimensional template.

* * * * *